United States Patent
Gettman et al.

(10) Patent No.: US 7,423,653 B2
(45) Date of Patent: Sep. 9, 2008

(54) DISPLAYING GRAPHICAL TEXTURES

(75) Inventors: David Gettman, London (GB); David Brownlee, London (GB); Leslie Peters, London (GB); Nicole Morris, Monaco (GB)

(73) Assignee: Three-B International Limited, Nassau (BM)

( * ) Notice: Subject to any disclaimer, the term of this patent is extended or adjusted under 35 U.S.C. 154(b) by 171 days.

(21) Appl. No.: 10/864,816

(22) Filed: Jun. 8, 2004

(65) Prior Publication Data

US 2005/0024376 A1    Feb. 3, 2005

(51) Int. Cl.
*G09G 5/00* (2006.01)
(52) U.S. Cl. .................. 345/587; 345/552; 345/582; 345/586; 345/584; 345/632; 345/633; 715/757
(58) Field of Classification Search ............. 345/586, 345/587, 632, 633; 715/757
See application file for complete search history.

(56) References Cited

U.S. PATENT DOCUMENTS

| | | | |
|---|---|---|---|
| 4,860,218 A | | 8/1989 | Sleator |
| 5,696,892 A | * | 12/1997 | Redmann et al. ............ 345/582 |
| 5,808,613 A | | 9/1998 | Marrin et al. |
| 5,841,440 A | | 11/1998 | Guha et al. |
| 6,002,853 A | | 12/1999 | de Hond |
| 6,036,601 A | | 3/2000 | Heckel et al. |
| 6,055,563 A | * | 4/2000 | Endo et al. .................. 709/203 |
| 6,232,981 B1 | | 5/2001 | Gossett |
| 6,271,843 B1 | | 8/2001 | Lection et al. |
| 6,288,730 B1 | | 9/2001 | Duluk, Jr. et al. |
| 6,650,333 B1 | * | 11/2003 | Baldwin ...................... 345/552 |
| 6,924,810 B1 | * | 8/2005 | Tischler ..................... 345/541 |
| 2001/0019337 A1 | | 9/2001 | Kim |
| 2002/0013738 A1 | | 1/2002 | Vistisen |
| 2002/0093541 A1 | | 7/2002 | Schileru-Key |
| 2002/0154174 A1 | * | 10/2002 | Redlich et al. .............. 345/848 |
| 2004/0054667 A1 | | 3/2004 | Kake et al. |

FOREIGN PATENT DOCUMENTS

| | | |
|---|---|---|
| EP | 1 014 257 A1 | 6/2000 |
| EP | 1 391 833 A1 | 2/2004 |
| JP | 7160634 A | 6/1995 |

(Continued)

OTHER PUBLICATIONS

David Cleary et al., "Creating a Semantic-web Interface with Virtual Reality," 2001, XP-002301058, pp. 138-146.

(Continued)

*Primary Examiner*—Kee M. Tung
*Assistant Examiner*—Antonio A Caschera
(74) *Attorney, Agent, or Firm*—Hickman Palermo Truong & Becker LLP

(57) ABSTRACT

A method of displaying a graphical texture comprises determining whether an update exists for a particular content element from among one or more content elements, wherein each content element is associated with one or more textures; if an update exists for the particular content element, performing the steps of determining a particular texture from among the one or more textures with which the information is associated; obtaining the particular texture, wherein the particular texture is generated based on the particular content element; and displaying the particular texture.

17 Claims, 7 Drawing Sheets

FOREIGN PATENT DOCUMENTS

| | | |
|---|---|---|
| WO | WO 99/13423 A1 | 3/1999 |
| WO | WO 01/52462 A2 | 7/2001 |
| WO | WO 01/57643 A1 | 8/2001 |
| WO | WO 01/69364 A2 | 9/2001 |
| WO | WO 01/69386 A2 | 9/2001 |
| WO | WO 01/84295 A1 | 11/2001 |
| WO | WO 02/086766 A2 | 10/2002 |
| WO | WO 02/093352 A1 | 11/2002 |
| WO | WO 02/095625 A1 | 11/2002 |
| WO | WO 03/014970 A2 | 2/2003 |
| WO | WO 03/025823 A1 | 3/2003 |
| WO | WO 03/058531 A1 | 7/2003 |

OTHER PUBLICATIONS

Andreas Dieberger et al., "A City Metaphor to Support Navigation in Complex Information Spaces," 1998, XP-002301059, pp. 597-622.

Katsuya Hakozaki et al., "Conceptual Design of a Virtual Library for Personal Use," 1999, XP-000831491, pp. 43-51.

International Searching Authority, "International Search Report," International Application No. PCT/GB2004/003208, 9 pages.

International Searching Authority, "Notification of Transmittal of the International Search Report and the Written Opinion of the International Searching Authority, or the Declaration," International Application No. PCT/GB2004/003185, 12 pages.

International Searching Authority, "Invitation to Pay Additional Fees," International Application No. PCT/GB2004/003195, 6 pages.

Jürgen Döllner et al., "Texturing Techniques for Terrain Visualization," 2000, Proceedings Visualization 2000, Salt Lake City, Utah and Annual IEEE Conference On Visualization, Los Alamitos, CA, pp. 227-234.

Wang Jing et al., "VRML Based Collaborative Visualization for Volume Product Datasets," 2004, Computer Supported Cooperative Work in Design 2004 Proceedings, Piscataway, NJ.

International Searching Authority, "Notification of Transmittal of the International Searching Report and the Written Opinion of the International Searching Authority, or the Declaration," International Application No. PCT/GB2004/003199, 3 pages.

International Searching Authority, "International Search Report," International Application No. PCT/GB2004/003199, 4 pages.

International Searching Authority, "Written Opinion of the International Searching Authority," International Application No. PCT/GB2004/003199, 7 pages.

International Searching Authority, "Notification of Transmittal of the International Search Report and the Written Opinion of the International Searching Authority, or the Declaration," International Application No. PCT/GB2004/003195, 2 pages.

International Searching Authority, "International Search Report," International Application No. PCT/GB2004/003195, 7 pages.

International Searching Authortiy, "Written Opinion of the International Searching Authority,"International Application No. PCT/GB2004/003195, 9 pages.

* cited by examiner

DISPLAYING GRAPHICAL TEXTURES

CROSS-REFERENCE TO RELATED APPLICATIONS

This application is related to prior co-pending application Ser. No. 10/727,799, filed 3 Dec. 2003 of David Gettman et al. entitled "Information Display," the entire contents of which are hereby incorporated by reference as if fully set forth herein.

FIELD OF THE INVENTION

The present invention generally relates to computer graphics. The invention relates more specifically to displaying graphical textures.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Certain classes of computer graphics systems are required to rapidly display large numbers of different graphical textures in real time as a user is interacting with the systems. For example, co-pending application Ser. No. 10/727,799, filed 3 Dec. 2003 of David Gettman et al., entitled "Information Display," describes in one aspect a browser for navigating a virtual three-dimensional environment that may comprise a virtual city in which textures rendered from HTML documents or Web pages are displayed on the sides of virtual buildings.

In this environment the browser is required to display the textures as a user navigates through the virtual city. In a virtual city having a large number of virtual buildings, the number of textures that are potentially stored and displayed may be very large, and each texture may be large, e.g., 1 Mb or larger. Storing thousands of such high-resolution textures for display in real time as a user navigates a virtual three-dimensional environment would require more main memory than is presently available in conventional personal computer systems. While some personal computers use graphics display cards that have a dedicated display memory facility, the memory capacity of such cards is typically too small to store all high-resolution textures for all textures that are in view.

While such textures could be stored in mass storage or a cache, loading the textures from such storage at display time would cause an unacceptable time delay for the user because such storage performs at a relatively slow rate. Thus, some textures may not be available in main memory or display memory when needed due to disk latency. What is needed is a better way to manage display of high-resolution textures in an environment in which some textures appear far away in a virtual environment such that many details of the textures are not visible from the viewpoint of the user when the textures are rendered for that viewpoint.

Further, in this environment certain textures are displayed in the foreground from the perspective of the user and other textures are displayed further away. To provide a realistic display the system is required to display foreground textures in high resolution; however, more distant textures need not have the same resolution. In this environment, it would be inefficient and costly in computational resources to store all textures at one high level of resolution and render the textures in low resolution when they are displayed in the distance. A better approach is needed for dealing with textures that have changing resolution requirements according to the position of the textures in the virtual three-dimensional environment.

Moreover, source content for the textures, such as HTML documents or Web pages, may change over time, for example as the owner or operator of an online Web site that serves HTML documents or Web pages makes changes to the documents or pages. Although such changes could occur at any time during use of the system, it is impractical to retrieve the source content whenever the viewpoint of the user changes or whenever there is a need to render the textures again.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Figure 1A:
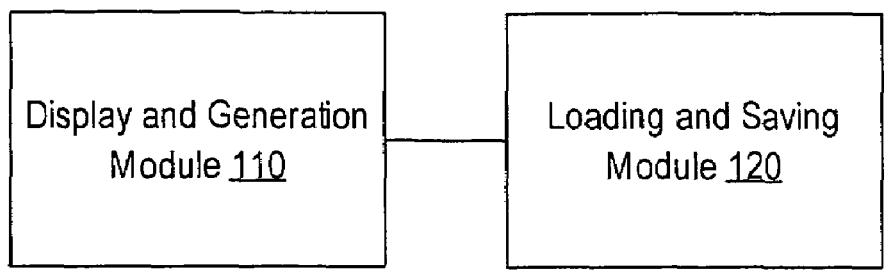
FIG. 1A is a block diagram that depicts an example system for displaying graphical textures.

A method and apparatus for displaying graphical textures is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural Overview
2.0 Functional Overview
4.0 Hardware Overview
5.0 Extensions and Alternatives 1.0 General Overview The needs identified in the foregoing Background, and other needs and objects that will become apparent for the following description, are achieved in the present invention, which includes, in one aspect, a method of managing the display of a large number of graphical textures wherein not all the textures are visible at any one time, the method comprising the machine-implemented steps of creating and storing one or more pools of high-resolution textures in memory;

displaying the textures on polygons in a virtual three-dimensional environment; wherein one or more of the textures display informational content and deliver informational content to a viewer of the three-dimensional environment, wherein one or more of these textures can be viewed at a high level of detail, wherein one or more of the textures have approximately similar dimensions, and wherein a viewer can interact with one or more of the textures; wherein an arrangement of the textures is defined in one or more sources, and wherein the informational content associated with the textures may derive from one or more remote sources; and wherein the virtual three-dimensional environment comprises one or more channels and wherein one or more of the textures displaying informational content are aligned along the channels.

According to one feature, the step of displaying the particular texture comprises displaying the particular texture on a polygon in a virtual three-dimensional environment. According to another feature, the majority of such polygons are regular four sided 'quads'.

According to another feature, one or more caches of textures are created on a storage medium. Textures are saved to these caches after being generated from content downloaded from a remote source, or are copies of textures downloaded from remote sources. They may be saved as they become available, or all together on program exit. Textures are loaded from cache to be used for display either on program startup or on demand. According to another feature the program can populate the cache for different three-dimensional environments to the one currently displayed. According to yet another feature all of the textures relevant to the current virtual three-dimensional environment which are present in a cache are loaded from the cache upon entry to that virtual three-dimensional environment. According to still another feature the textures relevant to the current virtual three-dimensional environment which are present in a cache are loaded on demand from the cache.

According to another feature a cache of textures can be held in main memory.

According to yet another feature the textures can be compressed. Textures could be held in compressed form on the storage medium and uncompressed when loaded into memory. In another feature textures could be held in compressed form in memory and uncompressed before being transferred to the control of the graphics card. In yet another feature textures can be held in compressed form on the graphics card and uncompressed as required for display by the card.

According to still another feature the system can perform the steps of determining whether an update exists for a particular content element from among one or more content elements, wherein each content element is associated with one or more textures, and if any updates exists, updating the relevant texture or textures. If a texture is not available locally then it could be considered as suitable for updating.

In yet another feature a source content to texture generation pool can be created which permits more than one source content element to be processed simultaneously. Such a pool can be used to provide a single update or generation of a texture, or a continual stream of updates based on information contained in the content elements.

According to another feature generation pool entries can be related to display pool entries such that some of the display pool entries are reserved for generating textures. Such entries can be used by textures with a high texture priority.

Various events may cause a texture to be updated; including but not limited to: changes in position of the texture in the three dimensional environment, changes in associated content source, changes in mapping to associated texture source, content sources containing animation or other dynamic information, interactions with the user or characteristics of the user, such as age or language preference, or changes of the user's position and/or viewpoint within the virtual three-dimensional environment.

In a further feature a texture may be changed based on the status of updating that texture, such as indicating a load or generation is pending, in progress, or has failed.

Any of the above updates to a texture could result in a texture being regenerated, or download from a remote source.

In yet a further feature, the system can perform the steps of determining whether to display a lower resolution texture in place of a high-resolution texture based on one or more criteria. One or more low-resolution texture may be allocated for each high-resolution texture. Such low-resolution textures may be stored on a mass storage system, and/or downloaded via a network. The download of low priority textures may be ordered based on a defined texture priority, such priority may based on the viewer's location in the virtual three-dimensional environment.

According to another feature each low-resolution texture can be generated at the same time as the corresponding high resolution texture. According to a different feature each low resolution texture can be downloaded to a client computer system over a network. In a further feature one or more larger pools of lower-resolution textures corresponding to each high resolution texture are created.

In another feature the polygons are assigned texture priorities for the various options of loading from, saving to cache, generating, processing updates, providing live updates, downloading source content, downloading complete textures, or any of the other aspects of managing the environment. Such priorities can be assigned based on a number of criteria including the user's position and viewpoint in the world, whether the texture is likely to become visible in the near future, whether the source content has been updated since the texture was last generated, or contains information which would cause the texture to be updated dynamically. Each operation can have its own set of priorities—it is not necessary for the priorities relating to loading from cache to be the same as those for generating, though it is likely they may be similar.

In yet another feature, polygons having a higher texture priority are allocated entries in the high-resolution texture pool, and some of the remaining polygons are allocated low-resolution textures.

In another feature, the content is downloaded over a network to a client computer system, organized and rendered using the client computer system after downloading. In yet another feature the content is owned or controlled by more than one entity. In still another feature the source content comprises one or more of Internet pages, television screenshots, mobile phone pages, game screenshots, images, documents, or video content.

In another feature the system will perform the step of blocking the user from altering the location of textures within the virtual three-dimensional environment by interacting with the virtual environment.

In still another feature, when determining if a polygon associated with a particular textures needs to be made available; if the step of generating the texture has completed, the particular texture is displayed; if the step of generating the texture has not completed, a second particular texture is displayed. The second texture could be a low or high resolution texture, and could be related to an earlier version of the first texture, or selected from an existing set of alternative textures not based on the first texture.

In another feature when determining whether a polygon needs to be made available, wherein the polygon is associated with the particular texture; if the texture is in memory, the particular texture is displayed; if the texture is not in memory, a process to obtain that texture into memory is initiated, and a second particular texture is displayed while that load is not complete. In another feature the process of obtaining the texture comprises loading the texture from a local storage medium. In yet another feature the process of obtaining the texture comprises downloading the texture from a network.

In another feature, one or more texture pools are dedicated to the loading and generating of textures and a separate texture pool is created for dealing with the display of textures; when a texture is finished generating it will replace an entry in the display texture pool if the generated texture is required for viewing more urgently than one of the textures already in the display pool; the entry in the load/generate pool will then be released for user by other textures.

2.0 Structural Overview

FIG. 1A is a block diagram that depicts an example system for displaying graphical textures. The term "texture" refers to a digital bitmap image that has been previously rendered from source content, such as an HTML document or Web page or other interactive content. A display and generation module 110 is communicatively coupled to a loading and saving module 120. The display and generation module 110 and loading and saving module 120 each comprise one or more computer programs, instructions, or other software elements that cooperate to perform the functions described herein. In general, display and generation module 110 is responsible for displaying and generating textures in a computer display. Loading and saving module 120 is responsible for loading and saving textures to and from memory, respectively, as needed according to the methods described herein.

Figure 1C:
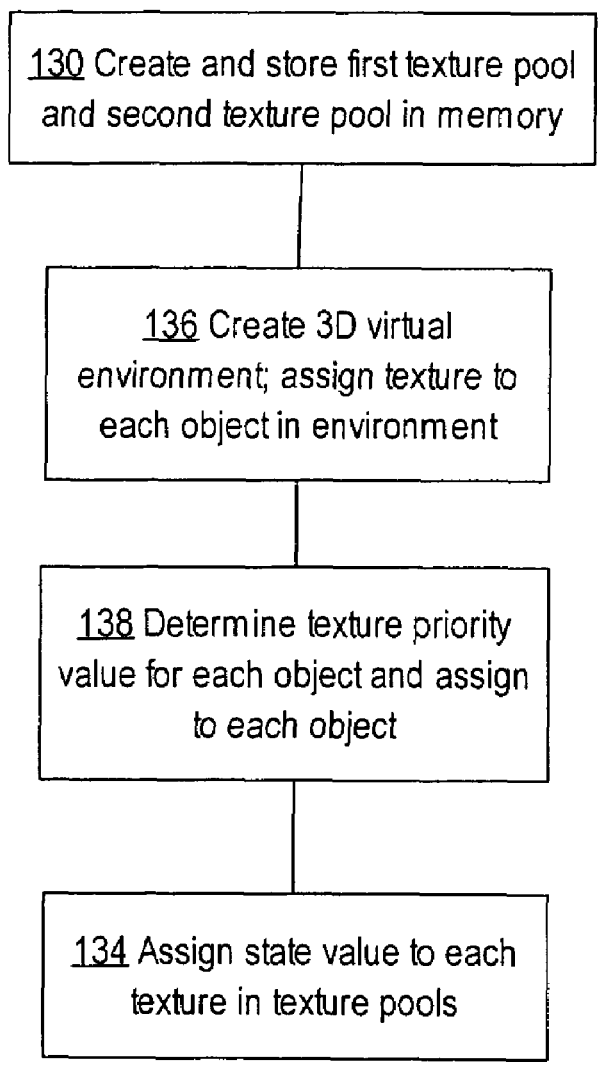
FIG. 1C is a flow diagram providing a high-level overview of a process for preparing to displaying textures in a virtual three-dimensional environment.
Figure 1B:
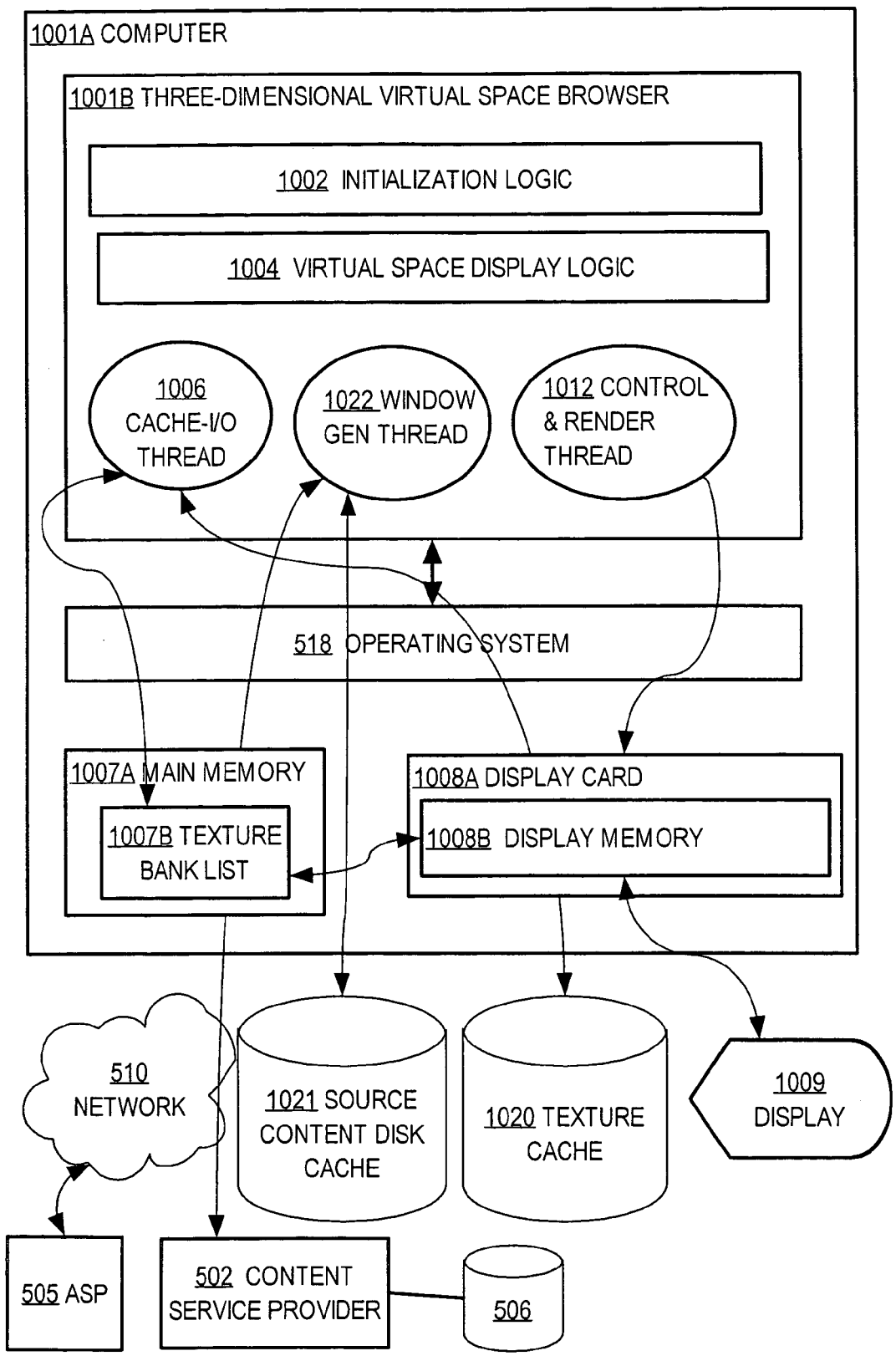
FIG. 1B is a block diagram of an example virtual space browsing system in which an embodiment may be used.

FIG. 1B is a block diagram of an example virtual space browsing system in which an embodiment may be used. A computer 1001A hosts a three-dimensional virtual space browser 1001B and an operating system 518. The computer 1001A also includes a main memory 1007A and a display card 1008A having display memory 1008B. Display card 1008A may use some of the main memory 1007A for storage of display information. Computer 1001A is communicatively coupled directly or indirectly through one or more networks 510 to an application service provider 505 and one or more content service providers 502 that host stored content 506. In an embodiment, application service provider 505 comprises a city server of the type described in Gettman et al. Computer 1001A contains or can access a source content disk cache 1021 and secondary page cache 1020. Computer 1001A displays textures and other graphic images or subject matter on a display 1009. In one embodiment, computer 1001A comprises a personal computer based on the PCI bus, a workstation, a PDA, a TV set-top box, a mobile phone, etc.

Three-dimensional virtual space browser 1001B comprises initialization logic 1002, virtual space display logic 1004, a cache-input/output (I/O) thread 1006, window generation thread 1022, and control/rendering thread 1012. Threads 1006, 1022, 1012 are spawned by virtual space display logic 1004 in cooperation with operating system 518 to perform the functions described herein.

In general, initialization logic 1002 interrogates display card 1008A, determines what graphic display functions are provided by the display card, and turns such functions on or off, including providing parameter values as needed, and adjusts its usage of the card based on the available capabilities and resources. The foregoing capability of initialization logic 1002 is provided because various brands of graphics cards offer different types of display functions, thereby enabling three-dimensional virtual space browser 1001B to inter-operate with many different kinds of graphics cards. For example, display card 1008A may provide an anti-aliasing function for improving the appearance of graphical images that it displays. Initialization logic 1002 can detect the presence of an anti-aliasing function in display card 1008A and provide settings to enable the card to properly configure the function.

Further, in an embodiment, virtual space display logic 1004 interacts with display memory 1008B to display a relatively small number of high-resolution textures and a relatively large number of low-resolution textures in the display memory. In this manner, display memory 1008B is continually updated to store high-resolution textures that are associated with virtual locations that are near a particular user viewpoint within a virtual three-dimensional environment, which is a relatively small number of high-resolution textures, as well as all textures that appear in the distance with respect to the user viewpoint, which is a larger number of low-resolution textures. Techniques for maintaining the correct number of textures in display memory 1008B are described further herein.

In an embodiment, content 506 of a content service provider 502 comprises one or more HTML documents or Web pages. Computer 1001A can obtain an updated copy of content 506 at any time by communicating with content service provider 502 through network 510. Further, content 506 may be locally cached at computer 1001A using source content disk cache 1021. For example, source content disk cache 1021 can store recently used source content, such as HTML documents or Web pages, or source content used to generate textures which are within a current field of view with respect to the user's then-current viewpoint of the virtual three-dimensional environment, or that are likely to be viewed next by the user as indicated by the user's location within the virtual three-dimensional environment.

Cache-I/O thread 1006 is responsible for loading textures and paging textures to the texture cache 1020. The cache-I/O thread 1006 is also responsible for saving updated textures generated from source content 506 to the texture cache 1020. Texture generation thread 1022 is responsible for retrieving content 506 from a content service provider 502 and generating a texture based on the content, utilizing source content disk cache 1021 as appropriate. Control & rendering thread 1012 is responsible for overall control of elements of the system and for rendering textures to the display card 1008A and its display memory 1008B in accordance with capabilities of the display card.

FIG. 1C is a flow diagram providing a high-level overview of a process for preparing to display textures in a virtual three-dimensional environment. In step 130, a first texture pool and a second texture pool are created and stored in memory. In one approach, each texture is defined and stored in two versions derived from the same source content and comprising a high-resolution texture and a low-resolution texture. Either available main memory or display memory stores a relatively small pool of a few high-resolution textures and a relatively larger pool of lower-resolution textures. There are no particular limits on the size of each pool. The small pool primarily contains textures that are close to the current or prospective viewpoint of a user in a virtual three-dimensional environment. The larger pool primarily contains textures that are metaphorically in the distance with respect to the user viewpoint. In an alternative embodiment, the large texture pool could be split into a pool for loading and generating textures and a separate pool for displaying textures.

In one embodiment, a low-resolution version of all possible textures is stored in local mass storage associated with a display client, such as disk storage for computer 1001A. Content service provider 502 or application service provider 505 can periodically generate low-resolution textures for all display locations of a virtual environment (e.g., display windows in a virtual city) and provide the low-resolution textures to the three-dimensional virtual space browser 1001B at one time. For example, browser 1001B can download and store all low-resolution textures at start-up or initialization time, or as part of an installation process. As a result, the browser 1001B only needs to generate high-resolution textures for display locations that are close to a viewpoint of the user, and for distant windows for which source content has changed since the low-resolution textures were received from the content service provider. When the browser generates a high-resolution texture it also generates an updated low-resolution texture.

In one variant of this approach, if texture generation is required for any of the textures, then a certain number of high-resolution texture pool entries may be reserved for textures that are undergoing active generation. Since there are a limited number of entries in the high-resolution texture pool, entries are assigned to objects that have high texture priority values.

In step 136, a virtual three-dimensional environment is created. Each quad in the virtual three-dimensional environment is provided with a quad identifier. Each texture has a texture identifier. A texture identifier is assigned to each quad.

In step 138, a texture priority value is determined and assigned to each quad. The texture priority value indicates the current priority order in which textures are displayed in the virtual environment. In one embodiment, the texture priority value is based upon a plurality of factors such as whether a quad is in view, whether a user has chosen the quad as a destination, how far the quad is from the viewer, and an angle of the quad with respect to the viewer. Each texture priority value is periodically re-calculated based on the viewer's then-current position and viewing angle as well as user interactions. Further, entries in the texture pool are re-allocated to provide optimal usage. In particular, entries in the texture pool for textures that have become too far away from the viewer's virtual viewpoint are discarded. Textures that are based on changed source content may be re-generated from the source content.

In step 134, a state value is assigned to each texture in the high-resolution texture pool. The use of state values is described further in other sections herein.

In the foregoing approach, as display locations come into view from the viewpoint of a user, the browser 1001B retrieves high-resolution textures for visible display locations from texture cache storage and displays, them. If source content for such textures has changed since the last display time, then the high-resolution textures may be re-generated and displayed. The re-generation process is expected to be far slower than loading and displaying high-resolution textures from storage and potentially uses up memory that instead could be used to display additional high-resolution textures within the virtual environment. Therefore, in an alternative approach, generation of all high-resolution textures may be done by a server and browser 1001B may download each high-resolution texture over a network connection to the server as each texture comes into view.

Further, in one approach, if the high-resolution texture pool entry associated with a quad does not have a high-resolution texture loaded at the time that display is needed, but the corresponding high-resolution texture is available on disk, then a low-resolution texture is used and displayed and the high-resolution texture is scheduled for loading.

In an embodiment, low-resolution textures are assigned to the low-resolution texture pool as follows. All quads in view from the user's viewpoint, or within a certain distance thereof, for which no high-resolution texture is loaded, are provided with entries in the low-resolution texture pool. Any low-resolution texture that is assigned an entry in the low-resolution texture pool but that is not present in memory is scheduled for loading.

One embodiment also uses standard techniques in which each texture contains multiple image resolutions or 'mipmaps' to improve the display performance and to provide a better quality display during movement of the viewer's virtual position.

Thus, the approaches herein use multiple versions of textures having varying resolution, in contrast to prior approaches in which the level of detail of an image is changed by varying the number of virtual polygons on models, or having multiple image resolutions within each texture object.

In one embodiment, main memory 1007A comprises a texture bank list 1007B. The texture bank list 1007B is a data structure that identifies or references all available high-resolution textures that are then-currently in use, set for loading, or generating. In an embodiment, the following three data structures are used to determine what textures should be in the texture bank and to coordinate between a main thread as described below and a worker thread for loading and saving as described below. In an alternative embodiment, there may be two pools—a texture bank for loading and generating textures and a material bank used for displaying textures.

First, a LiveQuadGeneratePriorityList structure stores a list of quads that are suitable for being made live, ordered by priority. A live quad is one which is in view in the world and whose texture is being repeatedly updated based on information contained in the source content. Second, a QuadGeneratePriorityList stores a list of quads without valid or with out-of-date textures that are close enough to warrant generating, ordered by priority. Third, a QuadDisplayPriorityList stores a list of quads with valid textures and suitable for displaying. In this context, "suitable for displaying" means the quads are close enough to the viewer's viewpoint to be seen by the viewer. The list of quads is ordered by priority, and does not contain any quad without a valid texture in memory or on disk. A quad with an out-of-date texture can be on both the QuadGeneratePriorityList and the QuadDisplayPriorityList.

3.0 Functional Overview 3.1 Displaying Graphical Textures—Main Thread

Figure 2:
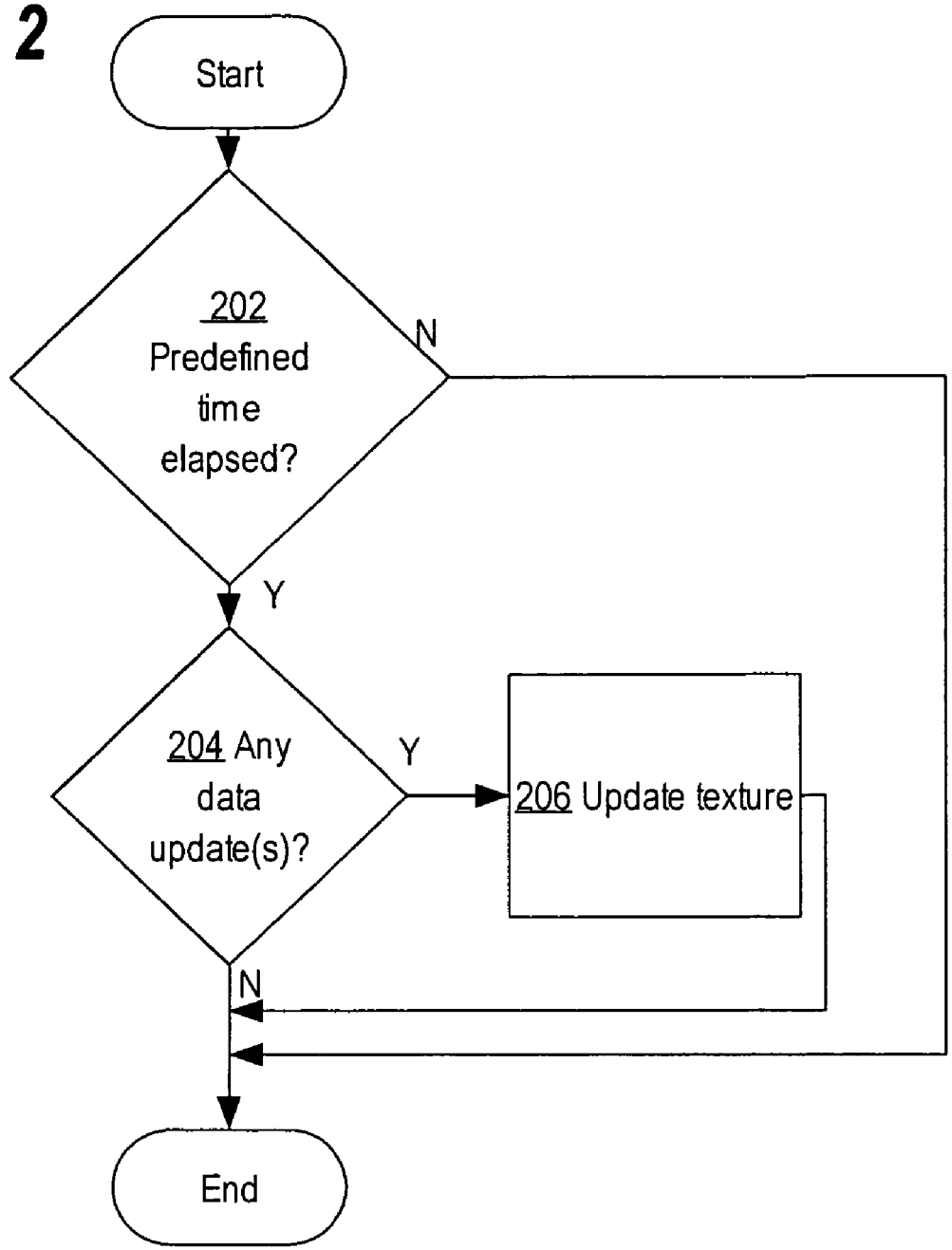
FIG. 2 is a flowchart that depicts a process for dynamically updating textures.
Figure 3:
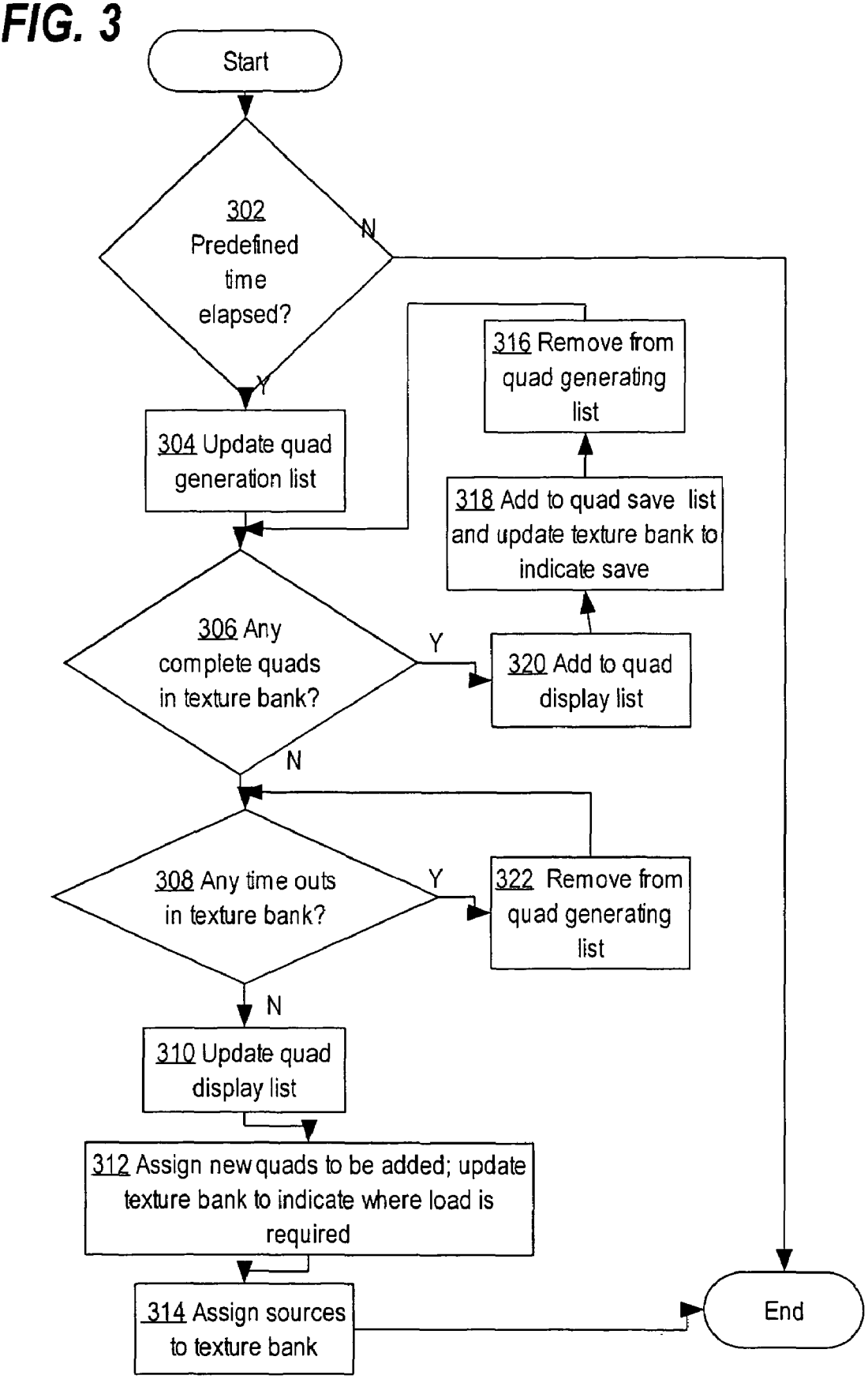
FIG. 3 is a flowchart that depicts a process for handling dynamically updated quads.
Figure 4:
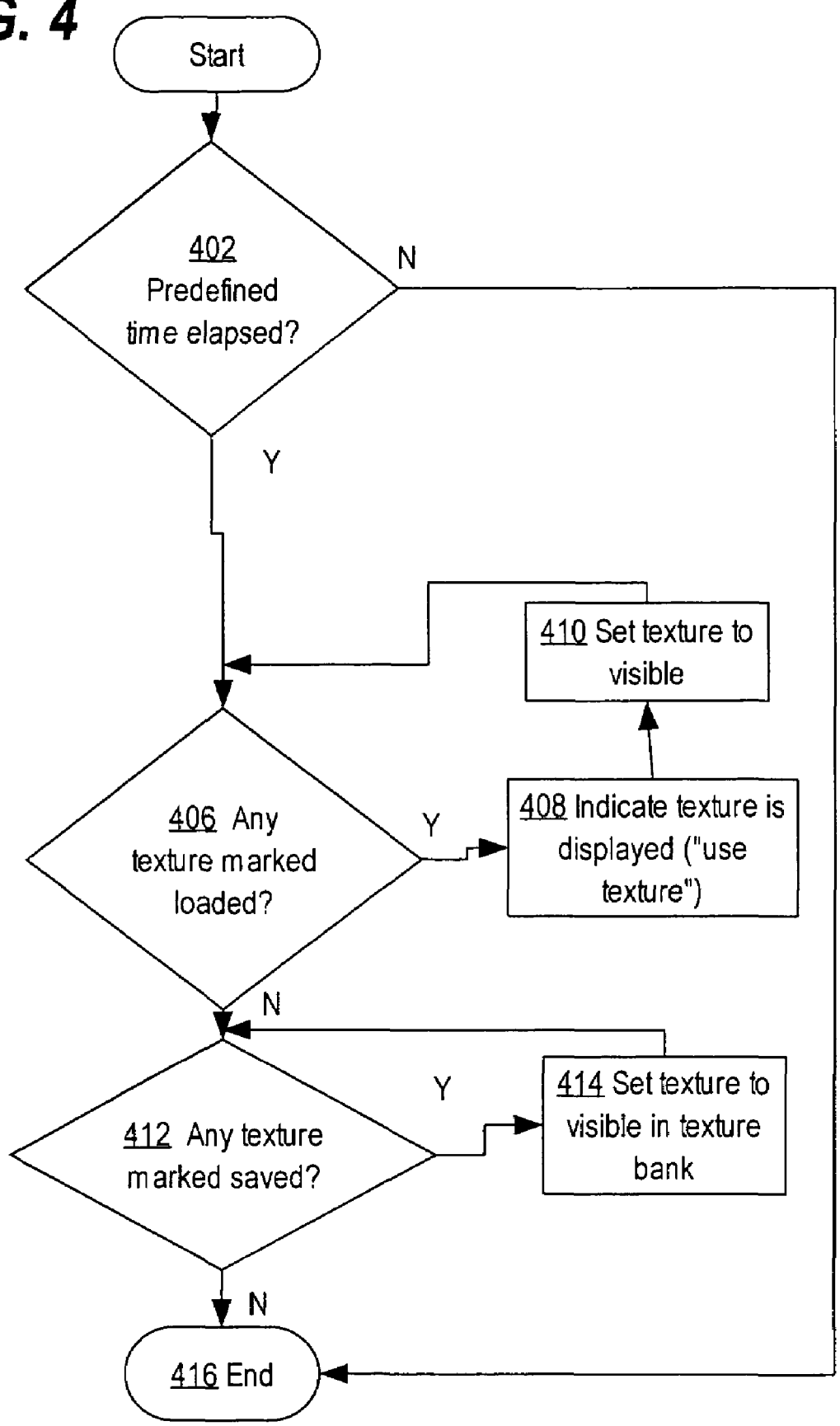
FIG. 4 is a flowchart that depicts a process for handling dynamically updated textures.
Figure 5:
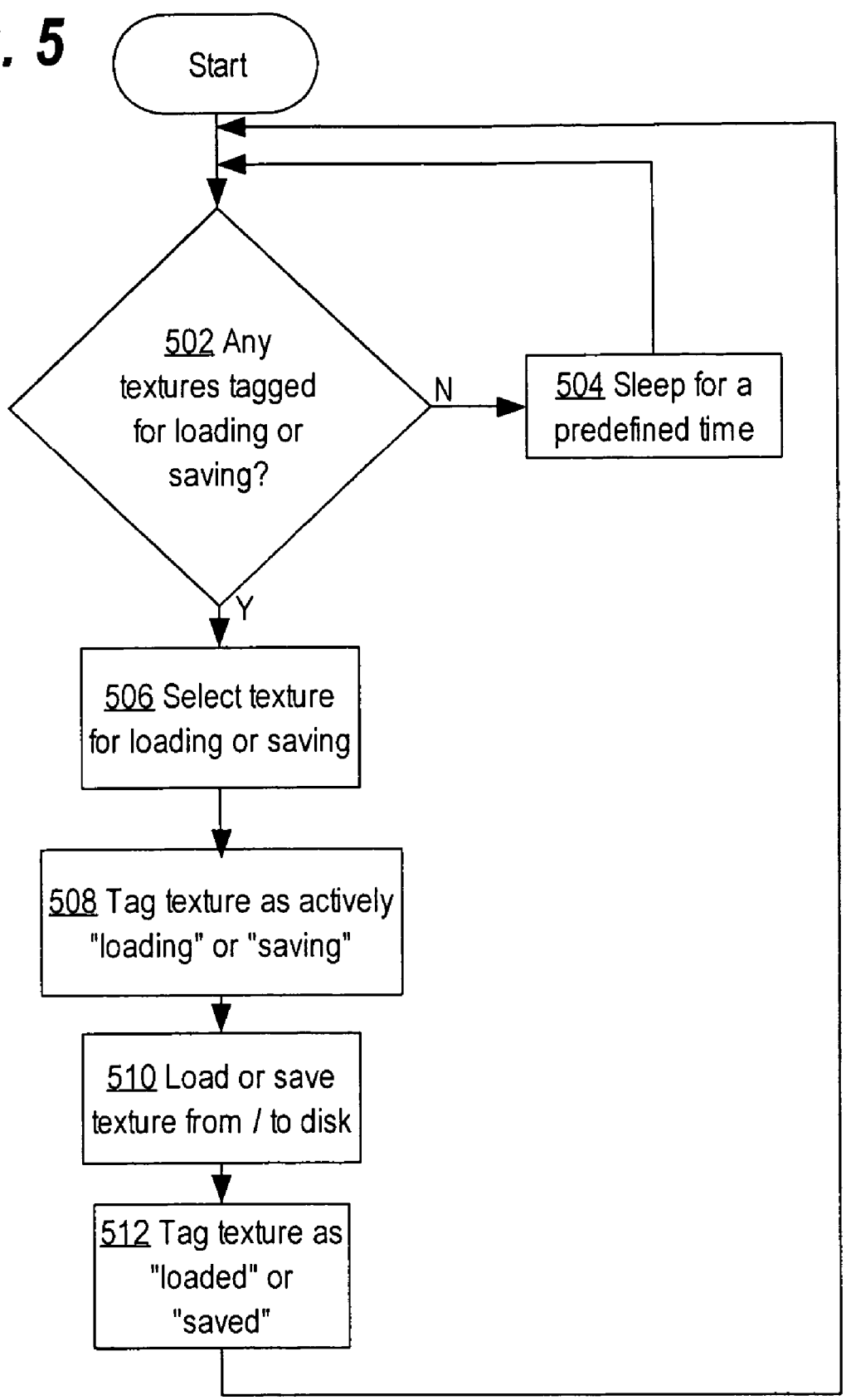
FIG. 5 is a flowchart that depicts a process for loading or saving textures.

FIG. 2 is a flowchart that depicts a process for handling updates to textures. FIG. 3 is a flowchart that depicts a process for handling dynamically updated quads. FIG. 4 is a flowchart that depicts a process for handling dynamically updated textures. FIG. 5 is a flowchart that depicts a process for loading or saving textures. Various embodiments of FIG. 2, FIG. 3, FIG. 4, and FIG. 5 provide techniques for displaying graphical textures that may be rapidly updated based on changes in external content associated with the textures and that may be rapidly displayed as a user viewpoint navigates within a virtual three-dimensional environment or interacts with a virtual space browser. Although each of FIG. 2, FIG. 3, FIG. 4, and FIG. 5 depicts a certain flow of events, embodiments of the invention are not limited to these steps or this flow. Additional steps could be performed, steps could be left out, and the steps could be performed in parallel or in a different order.

In an embodiment, the processes of FIG. 2, FIG. 3, and FIG. 4 are implemented as a main processing thread as part of virtual display logic 1004 (FIG. 1).

Referring first to FIG. 2, a process for handling updates to textures comprises determining if a specified or pre-defined time period has elapsed, in step 202. The specified time period is selected to provide a reasonable update frequency for a display of textures. For example, in one embodiment the specified time period is 0.1 seconds so that the display is updated ten (10) times per second.

If so, then in step 204 the process determines whether one or more texture updates are available. In this context, an update refers to a new texture, or a source content determined change in the texture. For example, in the context of FIG. 1B, computer 1001A will have requested content service provider 502 to serve a current copy of content 506, and window generator thread 1022 will process the source content and provide an updated texture for control and render thread 1012. If none of the quads to which the texture applies are 'live', then step 204 will evaluate to true once at the end of the processing of the source content, and control will pass to step 206 which will update the texture in the world. If one or more of the quads to which the texture applies are 'live', then step 204 will evaluate to true once at the end of initial processing of the source content, then repeat an arbitrary number of times as the source content determines that a change to the viewed texture is required. Some source content once downloaded may contain all information required to determine when to make updates to the texture, such as a web page with an animated image. Other source content may define a process that subscribes to events that are published by content service provider 502, in which the events indicate when an update to the texture is required, such as a news ticker.

Thus, the approach herein enables multiple updates to be processed over a particular time period for any form of source content that dynamically changes, whether it contains active visual content, such as an animated image, airline flight arrival or departure information, or is merely updated periodically, such as a news story or a recent special offer.

Updating a texture in block 206 may involve, in one embodiment, processing dynamically updated quads. In this context, a "quad" is a four (4)-sided object that may display a texture. In one embodiment, a quad is a surface of a virtual building that is displayed within a virtual city, so that displaying a texture in a quad gives the appearance of displaying content of the texture within a display window of the virtual building.

In certain embodiments, the same texture may be displayed on multiple quads. Each texture is provided with a unique identifier and each quad is provided with a unique identifier. A quad list data structure maintained by three-dimensional virtual space browser 1001B maps each quad identifier to a texture identifier that specifies what texture is to be displayed on the associated quad. Further, a texture list data structure maps a particular texture identifier to one or more quads.

FIG. 3 is a flowchart that depicts a process for handling dynamically updated quads. Referring now to FIG. 3, in step 302 a test is performed to determine if a specified or pre-defined time period has elapsed. Step 302 is intended to broadly indicate that the process of FIG. 3 may be performed repeatedly according to a timer, schedule, or in response to an event. In one embodiment, step 302 is associated with a ⅓-second timer so that the process of FIG. 3 is repeated three (3) times per second.

If the specified time has elapsed, then in step 304 a quad generation list is updated. The quad generation list is a data structure maintained by the three-dimensional virtual space browser 1001B that identifies quads that need to have their texture generated or updated from source data. The effect of step 304 is to determine whether quads need to be generated, and if so, add the quads to the generation list.

In step 306 a texture bank is consulted and a test is performed to determine whether any textures have completed generation. If so, then control passes to step 320 in which the complete quads which reference that texture are added to a quad display list. Thus, the complete quads become available for display later in the process. The texture bank entry associated with the completed texture is also updated to indicate the texture needs to be saved to the texture cache in step 318. In step 316, the complete quads are removed from the quad generation list if the test of step 306 is true.

However, if the test of step 306 is false, or after all complete quads are processed in the loop of step 320, 318, 316, then control passes to step 308 in which a test is performed to determine if any timeout has occurred for any quad identified in the texture bank. The purpose of step 308 is to determine whether a quad was not generated and displayed within a specified time period. In that case by policy the process prefers to recover resources that are used by the incomplete quad so that a different quad can be processed using the same resources. If the test of step 308 is true, then the associated quad is removed from the quad generation list in step 322.

Once there are no outstanding timeouts as determined by step 308, then in step 310, the quad display list is updated. The quad display list identifies which quads are most eligible to be displayed. For example, in one embodiment the quad display list does not contain non-visible quads. Thus, changes to the quad display list are primarily driven by the virtual position of a user or viewer in the virtual three-dimensional environment.

In step 312 the texture bank is updated based on the quad display list. For example, in one embodiment step 312 involves determining up to five (5) entries in the texture bank which refer to quads least appropriate to the current field of view for the user and replacing them with entries referring to textures from quads from the top of the quad display list which are not currently in the texture bank. The newly assigned texture bank entries are tagged with a state value indicating that they need to be loaded from memory or storage.

In step 314, content sources for textures to be generated or regenerated from source content are assigned to entries in the texture bank. The content sources may be obtained, in one embodiment, from the quad generation list data structure. Step 314 has the effect of further defining what textures should be in the texture bank.

FIG. 4 is a flowchart that depicts a process for handling dynamically updated textures. In step 402, a test is performed to determine if a predefined time has elapsed. In one embodiment, step 402 implements a timer having a duration of 0.1 seconds so that the process of FIG. 4 is repeated 10 times per second. If not, then the process of FIG. 4 terminates at step 416.

If the timer has elapsed, then in step 406, a test is performed to determine whether any texture in the texture bank which had previously been marked as load required has completed loading and is now marked as loaded into display card memory. If so, then in step 408 the texture is used in the virtual three-dimensional environment, and in step 410 the texture bank entry associated with that texture is marked as 'visible', which indicates it is currently being used in the virtual three-dimensional environment and could be eligible to be replaced at some point by another texture if the user's viewpoint changes such that the other texture would be a more appropriate use of that texture bank entry.

After all loaded textures are processed in the loop of step 406, 408, 410, in step 412 a test is performed to determine if any texture is marked as saved. If so, then the texture is set to visible in the texture bank at step 414. Such textures can be removed if they are too far away from a viewpoint of a viewer or user.

3.2 Loading and Saving Textures—Worker Thread

FIG. 5 is a flowchart that depicts a process for loading or saving textures. In one embodiment, the process of FIG. 5 is implemented in a worker thread of virtual space display logic 1004 of three-dimensional virtual space browser 1001B. The process of FIG. 5 may be applied to load textures into a video display card of a computer such as card 1008 of FIG. 1. Alternatively the process of FIG. 5 may be used to load textures into a texture bank in shared memory that is used for driving a display, or any other appropriate storage location that is linked to or referenced by a display. The process of FIG. 5 is particularly appropriate for loading or saving large, high-resolution textures.

In step 502, a test is performed to determine if any textures are tagged in the texture bank with a state value indicating that loading or saving is required. If no textures are so tagged in the texture bank, then in step 504 the process of FIG. 5 waits, ceases operation or "sleeps" for a specified small time period.

Otherwise, the loop of steps 506, 508, 510, 512 is performed for each texture that is tagged in the texture bank for loading or saving. In step 506, a tagged texture is selected for loading or saving. In step 508, the selected texture is tagged in the texture bank as then-currently undergoing a loading or saving operation. In step 510, the texture is loaded or saved from or to mass storage such as disk, as appropriate. In step 512, the texture is tagged as having been loaded or saved.

By indicating the texture bank entry on which is currently operating the worker thread permits the main thread to cancel load-required and save-required states of other texture bank entries based on updated quad priorities resulting from changes in the user's viewpoint while the worker thread is operating on its current texture bank entry.

Generally, the approach of FIG. 5 provides a way to selectively load textures into memory and display the textures based on an ordered list of what is to be displayed. For example, when display card 1008 has a relatively small memory space, the process of FIG. 5 may be used to load only those textures that are located directly in front of a virtual location of a viewer, user or browser within a virtual three-dimensional environment Alternatively, when display card 1008 has a large memory space, a larger number of textures may be tagged in the texture bank and subsequently displayed with the process of FIG. 5.

The information for the set of textures to load or save can either be held directly in the texture pool, or as a queue of operations. The queue gives the main thread more control over the order of actions and also becomes more efficient for larger total sizes of the texture pool.

As alternatives to FIG. 5, several other approaches may be used. If the virtual environment includes a large number of small textures then ensuring the optimal set is in memory as the viewer moves around can be relatively expensive, both in terms of computational cost, and in loading a large number of relatively small items from disk. According to one approach, the small textures are saved into a single file that is mapped into memory. In a variant of this approach, the file is maintained in an open state and each small texture is read at the appropriate time by seeking to the appropriate position in the file. This variant approach only affects the arrangement of textures on disk, and reduces disk overhead.

In a second approach, the virtual environment is divided into multiple sections, for example, by conceptually overlaying a large grid onto the virtual environment and grouping all objects in a single grid square together. The textures in the sections closest to the viewer are kept in memory. As the viewer moves around, entire sections of textures are discarded, and new sections are loaded. This approach significantly reduces the computational overhead of calculating which small textures should be in memory.

In a third approach, the foregoing two alternative approaches are combined, such that textures in a single section are stored together in the same file. It is possible to use a single file for all sections, or one file per section. A complication of this approach is that if a texture is used on more than one object it may be used in multiple sections, requiring it to be saved more than once.

In a fourth alternative approach, textures are held in a compressed format in main memory and uncompressed as required. This approach can be combined with the second approach above to reduce the computational cost of calculating which textures are needed, but the computational cost of uncompressing textures may outweigh that gain.

In a fifth approach, multiple textures are packed into a single hardware texture. For example, many graphics cards will only process textures for which the image width and height in pixels is expressed as a power of two (e.g., 256, 512, 1024, 2048). If the desired size is not one of these sizes then some of the memory allocated to the hardware texture is wasted. To avoid such waste, memory is allocated in an amount "wider" or "taller" than the actual texture size, and such memory stores multiple desired textures. For example, if the desired texture is 100×64 pixels, the system could allocate hardware textures of 512×64 and pack five desired textures horizontally across the hardware texture. At display time the system selects the desired area from the hardware texture. In the above case this would reduce the hardware texture memory usage by 20% as five textures fit into the space that previously would have held four. This method can be combined with any of the above approaches.

In a sixth approach, textures are compressed on disk to save disk space and reduce the disk activity time taken to load or save textures. While this approach may increase the preparation time for saving a texture, and the post-loading time, this trade-off is appropriate if disk activity is a limiting factor and CPU processing power is available. Use of this approach may complicate use of the first or third approaches above, as the textures would differ in size; usually the same texture would change in size if it is re-generated and resaved. If the texture grows in size, then it would no longer fit into the same space in the file. If the texture becomes smaller upon re-generation then it would fit, but would waste space.

3.3 Use of State Values

The approaches described above indicate that entries in the texture bank may be tagged with state values that enable threads to determine how to process the texture banks. In one embodiment, the valid state values include Available, Visible, Last Visible, Generating, Loading, and Saving. A state value of Available indicates that no valid texture is associated with the texture bank entry. A state value of Visible means that the associated texture bank entry has a texture loaded in memory and the associated quad in the virtual environment has a high texture priority value. A state value of Last Visible means that the texture was visible the last time the process checked, but the associated quad no longer has a high texture priority.

A state value of Generating means that texture content is being generated for the texture bank entry. A state value of Loading means that a texture has been assigned to a quad and a high-resolution texture exists in a storage location such as disk or network storage, and has been scheduled for loading from the storage location. While an entry has a state value of Loading, the associated quad uses a low-resolution texture in the virtual three-dimensional environment.

A state value of Saving means that generation has completed for the texture and is in the process of being saved. The texture can be displayed if the associated quad is in view in the virtual three-dimensional environment during the saving process. Once saved, the pool entry changes to Visible or Available depending on the quad texture priority.

In one embodiment, three loading states and three saving states are used to manage tasks between the main thread and worker thread described herein:

1. Action (load or save) required (set by main thread);
2. Action (load or save) in progress (set by worker thread);
3. Action (load or save) complete (set by worker thread).

The main thread may tag multiple entries in the texture bank for loading or saving. If the texture priorities change, then the main thread can cancel any tags that have not yet been acted upon or that are currently in progress in the worker thread. An action currently in progress cannot be cancelled.

When several outstanding load and save operations exist, the worker thread may balance operations so that all load operations are performed even when a series of save operations need to be performed, or when the converse occurs. If load operations are always given priority, then save operations will never occur when the viewer is moving fast enough to ensure that at least one load is always outstanding. This will result in the process of generating textures stalling until the viewer stops navigating in the virtual environment. This will maximize the number of large textures in view at any time, but will increase the probability of the viewer moving into a section of the environment where large textures have not yet been generated.

Alternatively, if save operations are always given priority then the generation speed is maximized, resulting in additional disk traffic from the generation processes and further reducing the disk bandwidth available to loading. This will minimize the chance of the viewer moving into an area without large textures, but reduce the number of large textures in view while moving.

In one approach, if any load operations are outstanding, then at least a certain number of the load operations are required to be performed between each save operation. As a result, this limits the maximum number of consecutive save operations, so there is no blocking of load operations for long enough to permit the viewer to move quite close to an object with an outstanding load operations.

3.4 Generating Textures

Generating textures may occur with two approaches. First, a texture may be re-generated because the texture is missing or out of date with respect to associated source content. Second, a texture may be re-generated because the quad displaying the texture may be very close in view and may have been tagged as a live quad, so that the texture displayed on the quad can be constantly updated based on information contained in the source content. The latter approach enables a quad to display animation, for example.

In either approach, a change in source content drives re-generating a texture. For example, source content such as could be displayed in a conventional Web browser can be rendered to a virtual memory window, and updates to this virtual memory window can be reproduced in the textures displayed onto a quad. An update may comprise a change in state of a Web page, such as an animated image. Three-dimensional virtual display browser 1001B may incorporate software elements that implement a conventional Web browser such as Mozilla for the purpose of loading Web pages comprising source content for textures, interpreting the HTML source code of the Web pages, and determining what texture updates are generated by such interpretation.

In one embodiment, updates that are generated as a Web page loads can be deferred until the page load is complete. The details of each update requested by the Web page, such as the area affected, are passed to the three-dimensional virtual space browser 1001B. The three-dimensional virtual space browser 1001B maintains one bitmap in memory per generation source, and reads out the affected area into the appropriate bitmap in memory. Each time the bitmap changes as determined by the conventional browser, the high-resolution texture is re-generated. If the generation source becomes inactive because the associated page load is complete or because the generation source is taken out of a live state, a low-resolution version of the texture is generated, and the bitmap data is saved to mass storage.

Dynamic content generation may be performed for a large texture pool using two approaches. In a first approach, each generating source always has an entry in the high-resolution texture pool. Until the generation is complete, the entry will show any previous version of the generated content. If there is no previous content the texture pool entry is effectively unused in the virtual three-dimensional environment until the generation is complete. In a second approach, generating sources do not automatically receive an entry in the high-resolution texture pool. This means a given texture can be both in the high-resolution texture pool (as the object is close and in view), and in a generation source (content is out of date), but there is no guarantee this will occur. A generation source that has an entry in the high-resolution texture pool is processed in the same fashion as the first approach above. Once a generation source that does not have an entry in the high-resolution texture pool has finished generating, the generated texture becomes eligible for being copied into the next available entry in the pool.

3.4 Application Notes

The present approaches are particularly useful for display of textures in a virtual three-dimensional environment in which a large number of large textures are used. For example, a virtual three-dimensional environment may comprise a series of channels such as virtual streets in a virtual city, or virtual aisles in a virtual store. The textures and their arrangement are defined externally to the present system based on metadata or a markup language description.

The approaches herein are useful for an environment in which textures provide informational content, as opposed to other approaches that are directed toward display of textures for aesthetic purposes, for example, in the background environment of a video game, or as part of characters of a game. The approaches herein may be used with textures that provide user interaction in the nature of a hyperlinked document. In the present approach, information-bearing textures are used to form or define a virtual three-dimensional environment rather than merely appearing in the environment.

The approaches herein are also useful when a large number of textures are rendered on flat virtual surfaces or polygons. Source content for the textures may come from remote sources or local sources. Source content for the textures may be owned or controlled by large groups of third parties. Source content may comprise internet pages, television screenshots, mobile phone pages, game screenshots, images, documents, or video content, etc. Textures may be dynamic and changing based on external content. A remote source can re-define which textures are in use and where they are located in the environment, during a user session. Multiple animated textures may be provided.

In one embodiment, users cannot modify the content or location of textures within the virtual environment by interacting with the environment.

4.0 Hardware Overview

Figure 6:
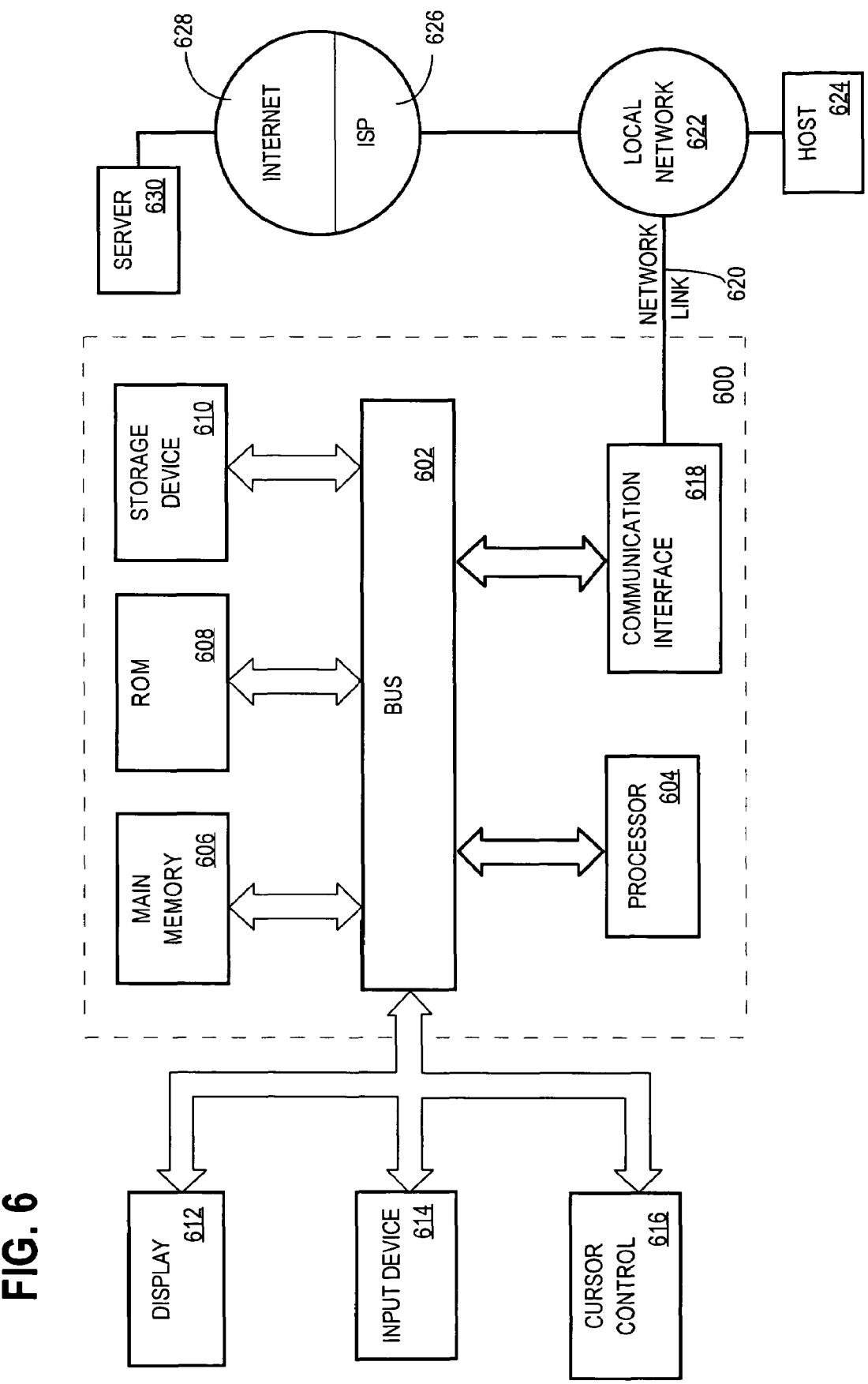
FIG. 6 is a block diagram that illustrates a computer system upon which an embodiment of the invention may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. A display card 611A having display memory 611B may be coupled to bus 602 for the purpose of driving display 612. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 600, various machine-readable media are involved, for example, in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. For example, in various embodiments, multiple sizes of textures may be used in combination with the approaches described above. Compressed textures may be used for either the high-resolution or low-resolution textures described herein so that decompression is performed just prior to display at the display card. Aggressive lossy compression may be used to reduce the storage size of textures. An in-memory cache may be provided. A plurality of different smaller textures may be combined and stored as a unit to reduce overall storage size. Thus, in one example, textures for adjacent windows of a virtual three-dimensional environment can be amalgamated and rendered as a single texture. Non-texture information or vector details may be stored in association with a texture for use to generate approximations of textures. The specification and drawings are, accordingly, to be regarded in an illustrative rather than a restrictive sense.

What is claimed is:

1. A method of managing the display of a large number of graphical textures wherein not all the textures are visible at any one time, the method comprising the machine-implemented steps of:

creating and storing one or more pools of high-resolution textures in memory;

displaying the textures on quads of polygons in a virtual three-dimensional environment on a computer display;

wherein one or more of the textures display informational content and deliver informational content to a viewer of the three-dimensional environment, wherein one or more of these textures can be viewed at a high level of detail, wherein one or more of the textures have approximately similar dimensions, and wherein a viewer can interact with one or more of the textures;

wherein an arrangement of the textures is defined in one or more sources, and wherein the informational content associated with the textures may derive from one or more remote sources; and wherein the virtual three-dimensional environment comprises one or more channels adjacent to and defining virtual spaces between the polygons and wherein one or more of the textures displaying informational content are aligned along the channels, further comprising having one or more lower resolution textures and determining whether to display a lower resolution texture in place of a high-resolution texture based on one or more criteria;

further comprising the step of downloading a low-resolution texture corresponding to one or more of the high-resolution textures via a network;

further comprising the steps of defining a priority ordering for the download of low-resolution textures and downloading low-resolution textures according to that priority.

2. A method according to claim 1, wherein the priority is based on the viewer's location in the virtual three-dimensional environment.

3. A method according to claim 1 further comprising generating each low-resolution texture at the same time as the corresponding high resolution texture.

4. A method according to claim 1 wherein in addition one or more larger pools of corresponding lower-resolution textures are created.

5. A method according to claim 1 further comprising downloading a complete texture to a client computer system over a network and allocating a priority order to the download of complete textures and downloading the complete textures in accordance with that priority.

6. A method as recited in claim 1 wherein polygons having a higher texture priority are allocated entries in the high resolution texture pool, and some of the remaining polygons are allocated low-resolutions textures.

7. A method according to claim 1 wherein the method further comprises the steps of:

determining whether a polygon needs to be made available, wherein the polygon is associated with a particular texture;

if the step of generating the texture has completed, displaying the particular texture;

if the step of generating the texture has not completed, displaying a second particular texture.

8. A method of managing the display of a large number of graphical textures wherein not all the textures are visible at any one time, the method comprising the machine-implemented steps of:

creating and storing one or more pools of high-resolution textures in memory;

displaying the textures on quads of polygons in a virtual three-dimensional environment on a computer display;

wherein one or more of the textures display informational content and deliver informational content to a viewer of the three-dimensional environment, wherein one or more of these textures can be viewed at a high level of detail, wherein one or more of the textures have approximately similar dimensions, and wherein a viewer can interact with one or more of the textures;

wherein an arrangement of the textures is defined in one or more sources, and wherein the informational content associated with the textures may derive from one or more remote sources; and wherein the virtual three-dimensional environment comprises one or more channels adjacent to and defining virtual spaces between the polygons and wherein one or more of the textures displaying informational content are aligned along the channels;

wherein the method further comprises the steps of:

determining whether a polygon needs to be made available, wherein the polygon is associated with a particular texture;

if the texture is in memory, displaying the particular texture;

if the texture is not in memory, initiating a process to obtain that texture into memory, and displaying a second particular texture while that load is not complete.

9. A method according to claim 8 wherein the process of obtaining the texture comprises loading the texture from a local storage medium.

10. A method according to claim 9 wherein a priority value is allocated to each texture for the purpose of loading textures and in which the priority value is used in the loading of textures.

11. A method according to claim 8 wherein the process of obtaining the texture comprises downloading the texture from a network.

12. A method according to claim 11 wherein a priority value is allocated to each texture for the purpose of loading textures and in which the priority value is used in the loading of textures.

13. A method according to claim 8 wherein one or more of the textures relevant to the current virtual three-dimensional environment which are present in a cache are loaded from the cache upon entry to that virtual three-dimensional environment.

14. A method according to claim 8 wherein the textures relevant to the current virtual three-dimensional environment which are present in a cache are loaded on demand from the cache.

15. The method according to claim 8, wherein the second particular texture is based on a previous version of the first particular texture.

16. The method according to claim 8, wherein the second particular texture is selected from an existing set of alternative textures not based on the first particular texture.

17. A method of managing the display of a large number of graphical textures wherein not all the textures are visible at any one time, the method comprising the machine-implemented steps of:
  creating and storing one or more pools of high-resolution textures in memory;
  displaying the textures on quads of polygons in a virtual three-dimensional environment on a computer display;
  wherein one or more of the textures display informational content and deliver informational content to a viewer of the three-dimensional environment, wherein one or more of these textures can be viewed at a high level of detail, wherein one or more of the textures have approximately similar dimensions, and wherein a viewer can interact with one or more of the textures;
wherein an arrangement of the textures is defined in one or more sources, and wherein the informational content associated with the textures may derive from one or more remote sources; and
wherein the virtual three-dimensional environment comprises one or more channels adjacent to and defining virtual spaces between the polygons and wherein one or more of the textures displaying informational content are aligned along the channels;
which further comprises the steps of:
  creating one or more pools in memory dedicated to loading and generating textures; and
  creating a separate pool in memory for displaying textures;
detecting that the generation of a texture is complete;
  determining that the generated texture is more optimal for display than at least one of the textures in the display pool;
  determining the texture in the display pool that is least optimal for display and replacing its display texture pool entry with the generated texture;
  making available for other textures the entry previously used for generating in the load/generate pool.

* * * * *

UNITED STATES PATENT AND TRADEMARK OFFICE
CERTIFICATE OF CORRECTION

| | |
|---|---|
| PATENT NO. | : 7,423,653 B2 |
| APPLICATION NO. | : 10/864816 |
| DATED | : September 9, 2008 |
| INVENTOR(S) | : David Gettman et al. |

It is certified that error appears in the above-identified patent and that said Letters Patent is hereby corrected as shown below:

On the title page of the patent, add:

[30] Foreign Application Priority Data
Jul. 25, 2003 [GB] Great Britain .......................................... 0317493.5

Signed and Sealed this

Ninth Day of December, 2008

JON W. DUDAS
*Director of the United States Patent and Trademark Office*